UNITED STATES PATENT OFFICE.

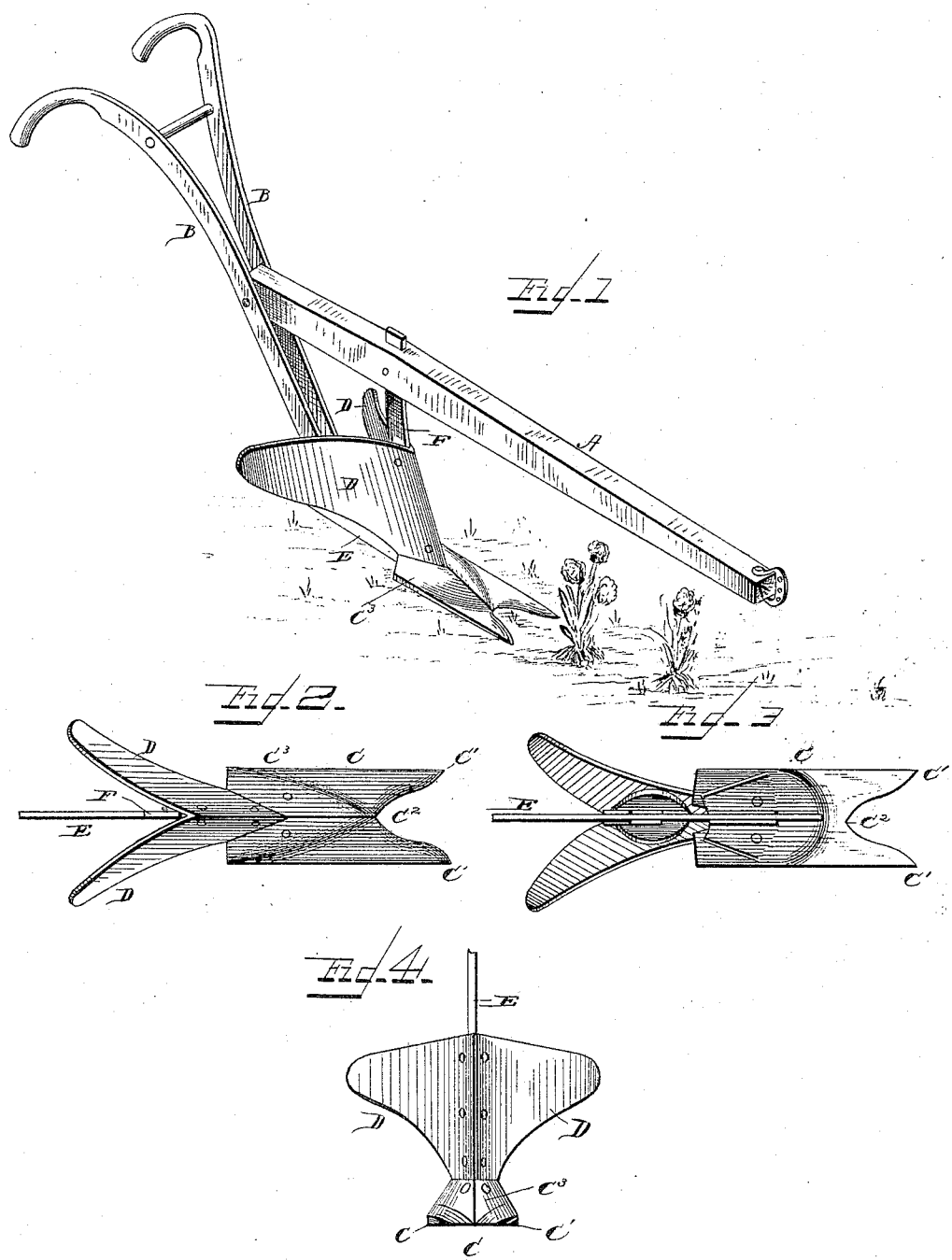

CARL A. SCHULZ, OF BELMONT, TEXAS.

PLOW.

SPECIFICATION forming part of Letters Patent No. 306,354, dated October 7, 1884.

Application filed May 21, 1884. (No model.)

*To all whom it may concern:*

Be it known that I, CARL A. SCHULZ, a citizen of the United States, residing at Belmont, in the county of Gonzales and State of Texas, have invented certain new and useful Improvements in Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a plow for removing cotton-stalks and their roots.

It consists in the parts which will be hereinafter described, and pointed out in the claims.

In the accompanying drawings, Figure 1 is a perspective view of my plow resting on the surface of the ground, the recessed blade or share being on a line with the row of stalks. Fig. 2 is a plan view of the mold-board, share, and standard. Fig. 3 is a bottom plan view of the parts with the beam and handles removed, and Fig. 4 is a front elevation of the same.

Like letters indicate like parts throughout the several views.

A represents the plow-beam, and B the handles.

C is the blade, having smooth parallel sides.

C' C' are the forward points on said blade, and $C^2$ a V-shaped recess in said blade. The edges of this recess are sharp.

$C^3$ is the raised or tapering portions of the blade or share.

D D are the double mold-boards. The rear part of the share $C^3$ is fixed to the bottom of the mold-board.

E is a drag-bar fixed to the under side of the share, and projecting rearward to form a rest for the plow. This drag-bar lies parallel with the parallel sides of the share.

F is a standard secured in the crotch of the mold-boards, and projecting upward and through the beam A. Said beam and standard are rigidly united.

The object of this invention is to take up and remove cotton-stalks and their roots. Said roots lie deep in the ground, and it is necessary to remove them before another crop can be planted.

A plow similar to the one herein shown may be easily drawn and operated by two horses.

The operation of the device is as follows: The horses, being hitched to the beam, are driven on either side of a row of stalks to be removed. The share is lowered into the ground five or six inches below the top of the ridge, and then moved forward on a line with the row. The cutting-jaws or recess $C^2$ are thereby drawn through the roots, and the latter cut and raised with the stalks and surrounding dirt and thrown to the right and left by the mold-boards. The plow leaves an open furrow behind it, into which the seed for the next crop may be planted.

There is an advantage in depositing seed in a furrow thus made. It is this: The furrow is made on the line of the old row. The row or ridge is the only part of the field that is protected from being stamped and packed by the horses and workmen; therefore the soil composing the ridge is comparatively loose at all seasons and more adapted to receive and retain the moisture than the dry packed portion contiguous thereto. This will be found a very decided advantage in dry seasons.

Having thus described my invention, I claim as new and desire to secure by Letters Patent—

1. The combination, with the double mold-board, of the recessed plow-blade, constructed in two parts secured to the mold-board, the said parts having flat points, which are provided with cutting-edges and raised portions extending from the crotch of the cutting-blades to the rear, in order to turn the soil to each side, substantially as specified.

2. The combination, in a plow, of the double mold-board, the standard and drag-bar, the plow beam and handles, and the plow-blade and drag-bar, all constructed and arranged substantially in the manner and for the purposes specified.

In testimony whereof I affix my signature in presence of two witnesses.

CARL A. SCHULZ.

Witnesses:
S. H. WALDIE,
A. W. LAY.